United States Patent
Giesert et al.

(10) Patent No.: US 11,241,937 B2
(45) Date of Patent: Feb. 8, 2022

(54) METHOD AND APPARATUS FOR CONTROLLING AIR CONDITIONING DEVICES IN A TRANSPORTATION VEHICLE

(71) Applicant: VOLKSWAGEN AKTIENGESELLSCHAFT, Wolfsburg (DE)

(72) Inventors: Anna-Lena Giesert, Seershausen (DE); Andreas Kaiser, Holm (DE); Malte Lansmann, Gardelegen (DE); Zeno Wolze, Berlin (DE); Oliver Hengstenberg, Märkisch Buchholz (DE); Jens Baumgarten, Berlin (DE); Markus Berg, Berlin (DE); Jan Effertz, Sickte (DE); Karsten Helms, Wasbüttel (DE); Frank Andres, Bröckel (DE)

(73) Assignee: Volkswagen Aktiengesellschaft

( * ) Notice: Subject to any disclaimer, the term of this patent is extended or adjusted under 35 U.S.C. 154(b) by 0 days.

(21) Appl. No.: 16/626,941

(22) PCT Filed: Apr. 25, 2018

(86) PCT No.: PCT/EP2018/060519
§ 371 (c)(1),
(2) Date: Dec. 27, 2019

(87) PCT Pub. No.: WO2019/001798
PCT Pub. Date: Jan. 3, 2019

(65) Prior Publication Data
US 2020/0130465 A1    Apr. 30, 2020

(30) Foreign Application Priority Data

Jun. 30, 2017  (DE) .................. 10 2017 211 202.6

(51) Int. Cl.
*B60H 1/00* (2006.01)
(52) U.S. Cl.
CPC ..... *B60H 1/00849* (2013.01); *B60H 1/00785* (2013.01); *B60H 1/00985* (2013.01); *B60H 2001/00733* (2019.05)
(58) Field of Classification Search
CPC .............. B60H 1/0065; B60H 1/00657; B60H 1/00849; B60H 1/00785; B60H 1/00985; B60H 2001/0733
See application file for complete search history.

(56) References Cited

U.S. PATENT DOCUMENTS

| 6,839,670 B1 | 1/2005 | Stammler et al. |
| 2006/0137871 A1* | 6/2006 | Roehm .............. B60H 1/00807 165/203 |

(Continued)

FOREIGN PATENT DOCUMENTS

| CN | 102897019 A  * | 1/2013 | ............... B60K 6/46 |
| CN | 104329768 A  * | 2/2015 | ......... B60H 1/00742 |

(Continued)

OTHER PUBLICATIONS

Search Report for International Patent Application No. PCT/EP2018/060519; dated Aug. 10, 2018.

*Primary Examiner* — Nelson J Nieves
(74) *Attorney, Agent, or Firm* — Barnes & Thornburg LLP

(57) ABSTRACT

A method for controlling air conditioning devices in a transportation vehicle wherein, upon the recording of an operator's air conditioning need and a conversion of the need into an air conditioning function for an air conditioning device, the implementability of the air conditioning need is compared with an influencing variable measured by a sensor. In response to the air conditioning need being recog- (Continued)

nized as implementable, information asserting this fact is issued to the operator. An apparatus for performing the method.

4 Claims, 2 Drawing Sheets

(56) References Cited

U.S. PATENT DOCUMENTS

| | | | |
|---|---|---|---|
| 2012/0166041 A1 | 6/2012 | Takehisa | |
| 2013/0184885 A1* | 7/2013 | Keil | G05B 23/0235 700/291 |
| 2013/0306297 A1* | 11/2013 | Sebastian | B60H 1/00971 165/202 |
| 2014/0316651 A1* | 10/2014 | Cho | H02J 7/1423 701/36 |
| 2016/0167480 A1* | 6/2016 | Kim | B60H 1/00971 165/202 |
| 2017/0120724 A1 | 5/2017 | Furse | |
| 2017/0369010 A1* | 12/2017 | Tarte | B60L 58/12 |
| 2018/0148008 A1* | 5/2018 | Gage | G07C 5/008 |
| 2018/0319243 A1* | 11/2018 | Blatchley | H01M 10/613 |
| 2018/0339573 A1* | 11/2018 | Mer | B60H 1/00807 |
| 2018/0354341 A1* | 12/2018 | Mer | B60H 1/04 |

FOREIGN PATENT DOCUMENTS

| | | | |
|---|---|---|---|
| CN | 106985632 A * | 7/2017 | |
| DE | 19533541 C1 | 3/1997 | |
| DE | 102007028607 A1 | 12/2008 | |
| DE | 102014209247 A1 | 12/2014 | |
| DE | 102014204890 A1 | 9/2015 | |
| DE | 102015221484 A1 | 5/2017 | |
| DE | 102016014223 A1 | 5/2017 | |
| EP | 1933303 A1 | 6/2008 | |
| KR | 20090075982 A | 7/2009 | |
| KR | 20130057626 A * | 6/2013 | |
| KR | 20130075069 A * | 7/2013 | |
| KR | 20140142954 A * | 12/2014 | |
| KR | 101654002 B1 | 9/2016 | |
| KR | 20170049384 A | 5/2017 | |
| WO | WO-2017154429 A1 * | 9/2017 | B60H 1/00 |

* cited by examiner

METHOD AND APPARATUS FOR CONTROLLING AIR CONDITIONING DEVICES IN A TRANSPORTATION VEHICLE

PRIORITY CLAIM

This patent application is a U.S. National Phase of International Patent Application No. PCT/EP2018/060519, filed 25 Apr. 2018, which claims priority to German Patent Application No. 10 2017 211 202.6, filed 30 Jun. 2017, the disclosures of which are incorporated herein by reference in their entireties.

SUMMARY

Illustrative embodiments relate to a method for controlling an air-conditioning device in a transportation vehicle and to an apparatus for executing the method.

BRIEF DESCRIPTION OF THE DRAWINGS

Exemplary embodiments of the method and an apparatus which is suitable for execution are explained below with respect to drawings. Here.

DETAILED DESCRIPTION

Figure 1:
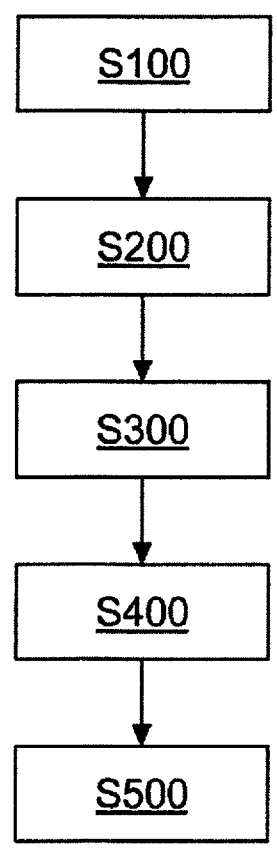
FIG. 1 describes the method for controlling an air-conditioning device.

The air-conditioning devices which are present in modern transportation vehicles have an ever greater variety of functions. While in the past it was only possible to set the temperature and the air distribution, nowadays numerous further devices are installed which can influence the climate of the transportation vehicle and therefore the wellbeing of the transportation vehicle occupants. This includes not only the seat heaters which are already widespread but also, for example, steering wheel heaters and ventilated seats.

The ever greater variety ensures that the settings which have to be made and the dependencies on which they are based are barely understandable for the operator. The operator will therefore select a setting which possibly does not completely satisfy their air-conditioning requirements or does not exhaust all of the existing possibilities. This consequently leads to a situation in which the operator's wellbeing is limited or the operator possibly has to adjust the settings which have been made.

An aggravating additional factor is that the demands which are made in respect of regulation quality are continuously increasing. To satisfy the demands, ever greater amounts of sensor data are accessed. The examples of this are air quality sensors or condensation sensors.

While air-conditioning devices could only be set manually in the past, nowadays electronically regulated systems are being found everywhere. The operator usually initially only specifies a temperature. The control of the air-conditioning system subsequently makes available an automatic operating mode which can be used to set the preselected temperature by employing a standardized air distribution. If the operator wishes to have a different air distribution, they have the option of intervening manually in the control process.

Even the limited number of parameters which have to be set for the air distribution are overtaxing for many operators. An aggravating additional factor is that the operator cannot always correctly evaluate the complex interactions between the setting possibilities, on the one hand, and the present boundary conditions, on the other, e.g., the air humidity. This leads to a situation in which the operator does not get close to their personal air-conditioning objective, or only does so in roundabout ways.

An aggravating additional factor is that the climate conditions in a transportation vehicle and the changes thereto are perceived very differently. They are particularly subject to personal sensations. This places high requirements on the control system of an air-conditioning device.

Therefore, a solution is sought which, on the one hand, exhausts the complex versatile possibilities of modern air-conditioning devices, but, on the other hand, permits simple and intuitive operator control.

A proposed solution for simple operator control of an air-conditioning device is made available by document DE 10 2014 204 890. In the document, a method for operating an air-conditioning device in a transportation vehicle is described which is equipped with a plurality of air-conditioning zones and a plurality of air-conditioning units. Disclosed air-conditioning units are here, e.g., the heat exchanger for generating heat or the corresponding actuator devices for air distribution. The method provides for an air-conditioning objective to be specified by the operator, wherein this specification can be made independently for each air-conditioning zone. A control apparatus converts these air-conditioning objectives of the operator into control parameters of the individual air-conditioning units. The air-conditioning objective is implemented in accordance with a specified profile.

DE 10 2014 209 247 discloses a solution for bringing about a desired comfort setting in a transportation vehicle. A comfort setting is understood here to be a superordinate air-conditioning demand of an operator. Further air-conditioning parameters are indirectly associated with this superordinate air-conditioning demand and can in turn trigger the air-conditioning units which are present in a transportation vehicle. The disclosed embodiments propose that the air-conditioning in the transportation vehicle is triggered by specifying a setting which is tailored to the subjective sensation. The implementation is subsequently carried out by actuating the individual air-conditioning units. This is intended to bring about effect-oriented, intuitive operator control of the air-conditioning device in a transportation vehicle.

Despite the described known solutions, the disclosed embodiments describe a demand-oriented, intelligent control process of the air-conditioning devices in a transportation vehicle which permits the variety of influencing variables acting on the optimum air-conditioning of a passenger compartment of a transportation vehicle to be taken into account comprehensively.

This is achieved by the disclosed method and the disclosed device which can be used to execute the method.

The technical effect which can be achieved with the disclosed solution consists in describing a simple intelligent method for bringing about an air-conditioning state, corresponding to the operator's wishes, in a transportation vehicle, which method is able to take into account in an appropriate way the complex interactions during air-conditioning.

The disclosed method proposes that in a first operation an air-conditioning demand which is formulated by an operator is registered. An air-conditioning demand is to be understood as a specification for the air-conditioning devices in the transportation vehicle which is oriented toward the operator's wishes. In the simplest case, this involves, for example, specifications such as "fast heating" or "fast cooling", supplemented by the indication of the target temperature. However, more wide ranging specifications such as "demist" or "warm feet" are also demand specifications.

The air-conditioning demand accordingly constitutes a description from the operator's point of view. Characteristically, such a demand can be implemented by a single air-conditioning device or else by a plurality of air-conditioning devices. In addition, it can contain supplementary information. For example, the specification "fast" which is mentioned in the abovementioned examples supplements the desire for heating or cooling with an indication which must have influence on the regulating characteristic.

The abovementioned air-conditioning devices are available for executing the air-conditioning functions. The term air-conditioning device is used according to the disclosure as a generic term for all devices in a transportation vehicle with which the climate can be adapted to the wishes of the transportation vehicle occupants. A heat exchanger is, for example, an air-conditioning device which can execute the air-conditioning function of "heating the passenger compartment of the transportation vehicle". A further example is a seat heater which permits the air-conditioning function of "heating the seat surface".

The disclosure provides for this demand to be resolved into at least one air-conditioning function on the basis of the specified air-conditioning demand. Such an air-conditioning function is uniquely assigned to an air-conditioning device. This method operation is carried out using a first control apparatus.

The disclosed air-conditioning functions are accordingly, in particular, the heating of the passenger compartment, which can be executed by a heat exchanger which is present, the cooling of the passenger compartment, which can be executed by an air-conditioning compressor, and other air-conditioning functions such as heating by a seat heater and/or steering wheel heater.

In addition, the disclosed method provides that at least one air-conditioning—relevant influencing variable is registered using sensors. This is understood to mean any variable which is significant with respect to the execution of the air-conditioning function.

Examples of air-conditioning-relevant influencing variables are the air quality outside the transportation vehicle, the degree of misting up of the front windshield, the temperature of the cooling water etc. However, the instantaneous temperature of the passenger compartment is also considered to be a relevant influencing variable.

In a further operation, the disclosed method provides a comparison of the at least one air-conditioning function, derived from the air-conditioning demand, with the at least one registered air-conditioning-relevant influencing variable. This operation takes place using a second control apparatus.

The first, the second and all other control apparatuses which are necessary for carrying out the method can also be combined in one unit.

As a result of this comparison it is determined whether the selected air-conditioning function and therefore the air-conditioning demand of the operator can be implemented and/or implementation is to be recommended under the given boundary conditions.

The result of this comparison is fed back to the operator via an output unit. Displays and/or loudspeakers are possible as the output medium for the feedback.

The following two examples explain the disclosed method operations:

The operator expresses the wish to heat the passenger compartment of the transportation vehicle quickly. However, the internal combustion engine has a cooling water temperature which is too low, which is detected using a sensor for temperature measurement. In this case, a corresponding indication that the increase in temperature can be implemented only slowly is issued.

The operator expresses the wish to increase the supply of fresh air into the passenger compartment of the transportation vehicle. However, the air quality sensor detects that the quality of the ambient air does not correspond to the requirements or is even worse than in the passenger compartment. In this case, feedback is output that the implementation of the expressed air-conditioning demand is not to be recommended.

The disclosed method provides different input possibilities for registering the air-conditioning demand of the operator. Touchscreens, voice-operated control systems and operator control keys are possible here.

In a further disclosed embodiment, after it has been detected that the air-conditioning function can be executed, it is executed automatically. In this refinement, the feedback to the operator serves exclusively to provide information and does not require any confirmation for implementation.

If the air-conditioning function is found not to be executable or not completely executable, a disclosed embodiment provides that an alternative proposal for at least one air-conditioning function is output, and after confirmation it is executed by the operator. If the cooling water temperature which is too low for rapid heating of the passenger compartment is detected in the abovementioned example, a proposal could be to additionally switch on the seat heater. The operator can subsequently accept or decline the proposal.

In a further disclosed embodiment, after the air-conditioning function is executed, i.e., after the air-conditioning demand is realized, a status message is output. This can be done, in particular, visually and/or by audio output.

The disclosed apparatus for executing the method disclosed above firstly comprises at least one input apparatus for registering an air-conditioning demand of an operator. Touchscreen apparatuses, conventional operator control keys or a voice input system are available for this.

Furthermore, at least one sensor is present for measuring an air-conditioning-relevant influencing variable. This sensor may be, for example, one for measuring the air quality within the interior of the transportation vehicle or a sensor for measuring the degree of misting up of the front windshield.

In addition in the described solution, a first control apparatus is provided which receives the air-conditioning demand of the operator. After the reception the first control apparatus resolves the signal into one or more control signals for suitable air-conditioning functions of the air-conditioning devices.

Furthermore, the disclosed embodiment comprises a second control apparatus, which can be used to test the possibility of executing the derived air-conditioning function. In this context it is tested whether the air-conditioning demand of the operator can be completely implemented or else whether boundary conditions are present which restrict implementation or make it impossible. One restriction may be, for example, a poor air quality of the external air or an excessively low cooling water temperature. If the air-conditioning device detects, on the basis of the sensor data, that the quality of the ambient air is worse than that in the passenger compartment, it cannot be sensible to execute the air-conditioning demand "increase fresh air supply".

As a further element, the disclosed apparatus therefore provides an output apparatus which is used to feed back the result of the comparison to the operator. Such feedback can occur, in particular, by a text output on a display or an audio output by loudspeakers.

In the first method operation at S100 illustrated in FIG. 1 the air-conditioning demand is input by the operator. This operation is carried out using suitable input apparatuses. Suitable input apparatuses are, in particular, touchscreens, operator control keys and/or voice registering systems. Examples of air-conditioning demands are:

- Activation of an anti-smell and anti-dust method or mechanism
- Request for fresh air
- Heating of the hands
- Heating of the feet
- Cooling of the feet
- Removal of condensation
- Fast heating
- Fast cooling In the subsequent method operation at S200, the registered air-conditioning demand is resolved into air-conditioning functions. The functions are assigned to the individual air-conditioning devices and can be executed by them. To implement an anti-smell and anti-dust method or mechanism, the air recirculation mode could be activated, for example.

Before the execution of the individual air-conditioning functions, in operation at S300 at least one relevant influencing variable is measured. In the present exemplary embodiment, this can involve, for example, the measurement of the air humidity to derive therefrom the risk of misting up of the front windshield. If this should be the case, the execution of anti-smell and anti-dust method or mechanism would not be appropriate.

In operation at S400, the logical comparison of the measured influencing variable with corresponding limiting values is carried out. Feedback to the operator about the implementability of the operator's air-conditioning demand is issued in accordance with the comparison result.

If the implementability is assessed positively, the execution of the at least one air-conditioning function can be started. If the implementability is not given or is given only to a limited extent, this content is fed back to the operator.

Figure 2:
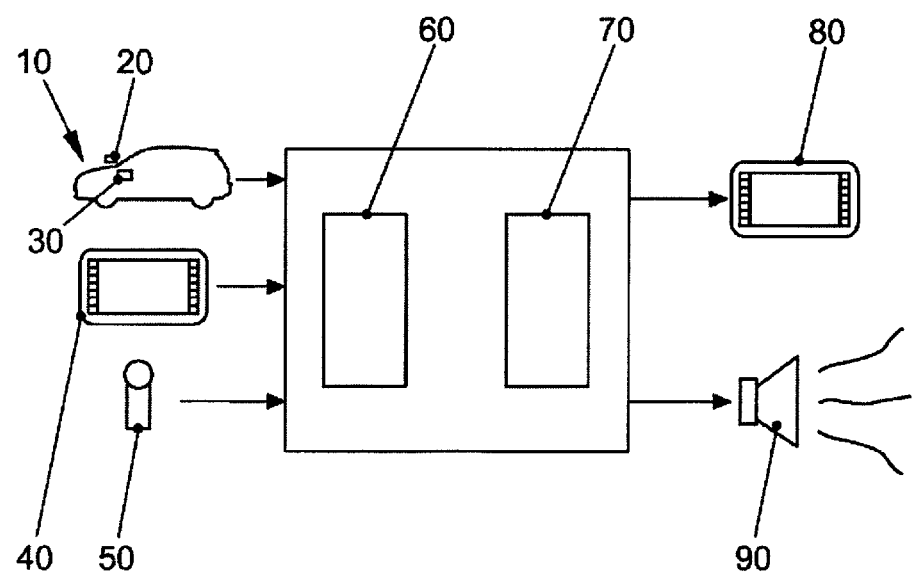
FIG. 2 shows the design of the air-conditioning device for executing the method.

FIG. 2 illustrates by way of example an apparatus with which the described method can be executed. It includes, firstly, suitable registration devices for inputting the operator's air-conditioning demand. Two possibilities, specifically the inputting by a touchscreen 40 and the inputting by a voice recognition system, which, as illustrated, is equipped with a microphone 50, are illustrated in the figure. Both input apparatuses and further alternative input apparatuses can be parts of the device, either individually or in combination.

To process the registered air-conditioning demand, a first control apparatus 60 is a part of the disclosed embodiments. It is implemented in such a way that it is used to convert the air-conditioning demand into at least one air-conditioning function for an air-conditioning device. A heat exchanger 30, which can be used to generate the heating air which is necessary to heat the passenger compartment, is illustrated for an example as an air-conditioning device.

Furthermore, the disclosed apparatus contains at least one sensor. In the explained example, an air quality sensor 20 is illustrated which is arranged in the transportation vehicle 10 typically in the region of the fresh air supply. In the illustrated exemplary embodiment, the air quality of the ambient air is measured using the sensor.

The air-conditioning function which is selected in the first control apparatus 60 is passed on as a suitable control variable to a second control apparatus 70. This control apparatus 70, which can also be combined with the control apparatus 60 in one unit, is suitable for making a comparison of the air-conditioning demand, or of the air-conditioning function derived therefrom, with the signals of the at least one sensor 20. The result which is generated in this process is used to output an indication about the possibility of executing the air-conditioning demand to the operator. In the illustrated exemplary embodiment, two output apparatuses are provided for this. A visual output can be made by a display 80 which is possibly integrated into the touchscreen 40 which is provided for registering the air-conditioning demand. For an audio output, a loudspeaker 90 is provided in the exemplary embodiment.

LIST OF REFERENCE SYMBOLS

10 Transportation vehicle
20 Air quality sensor
30 Heat exchanger
40 Touchscreen
50 Microphone
60 First control apparatus
70 Second control apparatus
80 Output display
90 Loudspeaker
S100 Registering an air-conditioning demand
S200 Resolving the air-conditioning demand
S300 Measuring an air-conditioning-relevant influencing variable
S400 Data comparison
S500 Feedback about the comparison result

The invention claimed is:

1. A method for controlling air conditioning devices in a transportation vehicle, the method comprising:
    registering an air-conditioning demand of an operator via a user interface;
    receiving the air-conditioning demand by a first control apparatus;
    resolving the air-conditioning demand into at least one air-conditioning function for at least one air-conditioning device using the first control apparatus;
    registering at least one air-conditioning-relevant influencing variable using at least one sensor;
    testing implementability of the air-conditioning demand using a second control apparatus by comparing the at least one air-conditioning function with the at least one air-conditioning-relevant influencing variable;
    outputting feedback to the operator about a result of the implementability test; and
    outputting a proposal to implement at least one deviating air-conditioning function for the operator in response to the implementability test indicating that the air-conditioning demand is not completely possible.

2. The method of claim 1, wherein registration of the air-conditioning demand is performed by a touchscreen and/or a voice-operated control system and/or operator control keys.

3. The method of claim 1, further comprising executing the at least one air-conditioning function in response to the implementability test indicating that the at least one air-conditioning function is possible.

4. The method of claim 1, further comprising successfully implementing the air-conditioning demand and subsequent to the implementation of the air-conditioning demand, outputting a status message indicating successful implementation.

* * * * *